United States Patent [19]

Norman

[11] 4,021,071
[45] May 3, 1977

[54] SELF-STORING STEP STRUCTURE FOR VEHICULAR MOUNTING

[76] Inventor: Thomas W. Norman, 2817 NW. 64th St., Oklahoma City, Okla. 73112

[22] Filed: May 16, 1975

[21] Appl. No.: 578,155

[52] U.S. Cl. .................................. 296/62; 182/84; 182/97; 214/85; 280/166; 293/69 R
[51] Int. Cl.² ........................................ B60R 3/02
[58] Field of Search .............. 296/62, 50, 51, 61, 296/57 R, 57 A, 13, 23 R, 23 G, 23 H; 280/163, 166, 164 R, 164 A; 293/69 R; 182/84, 97, 77, 85-87, 83, 127; 105/326, 427, 430, 431, 437, 438, 443, 447; 214/85, 77 P; 9/1.6; 114/71 R; 244/129 S, 137 P

[56] References Cited

UNITED STATES PATENTS

| | | | |
|---|---|---|---|
| 1,223,639 | 4/1917 | Swartsel | 296/62 |
| 1,384,713 | 7/1921 | Stephens | 296/61 |
| 2,568,093 | 9/1951 | Smid et al. | 280/164 R X |
| 2,611,466 | 9/1952 | Biggert | 182/97 X |
| 2,840,290 | 6/1958 | Roberts | 182/97 |
| 2,990,148 | 6/1961 | James | 182/127 X |
| 3,642,156 | 2/1972 | Stenson | 296/61 X |
| 3,669,218 | 6/1972 | Hall | 182/97 |
| 3,713,553 | 1/1973 | Curtis | 296/61 X |
| 3,853,369 | 12/1974 | Holden | 296/62 |
| 3,865,399 | 2/1975 | Way | 280/166 |
| 3,889,997 | 6/1975 | Schoneck | 296/62 |

*Primary Examiner*—L. J. Paperner
*Assistant Examiner*—Winston H. Douglas
*Attorney, Agent, or Firm*—William R. Laney

[57] ABSTRACT

A self-storing step structure for vehicular mounting including a first step section, means for pivotally connecting the first step section to a vehicle for pivotation about a horizontal axis between an operative position and a stored position, an extensible step section sidably engaging said first step section, and means for adjustably interlocking said first step section with said extensible step section at a preselected relative location.

4 Claims, 5 Drawing Figures

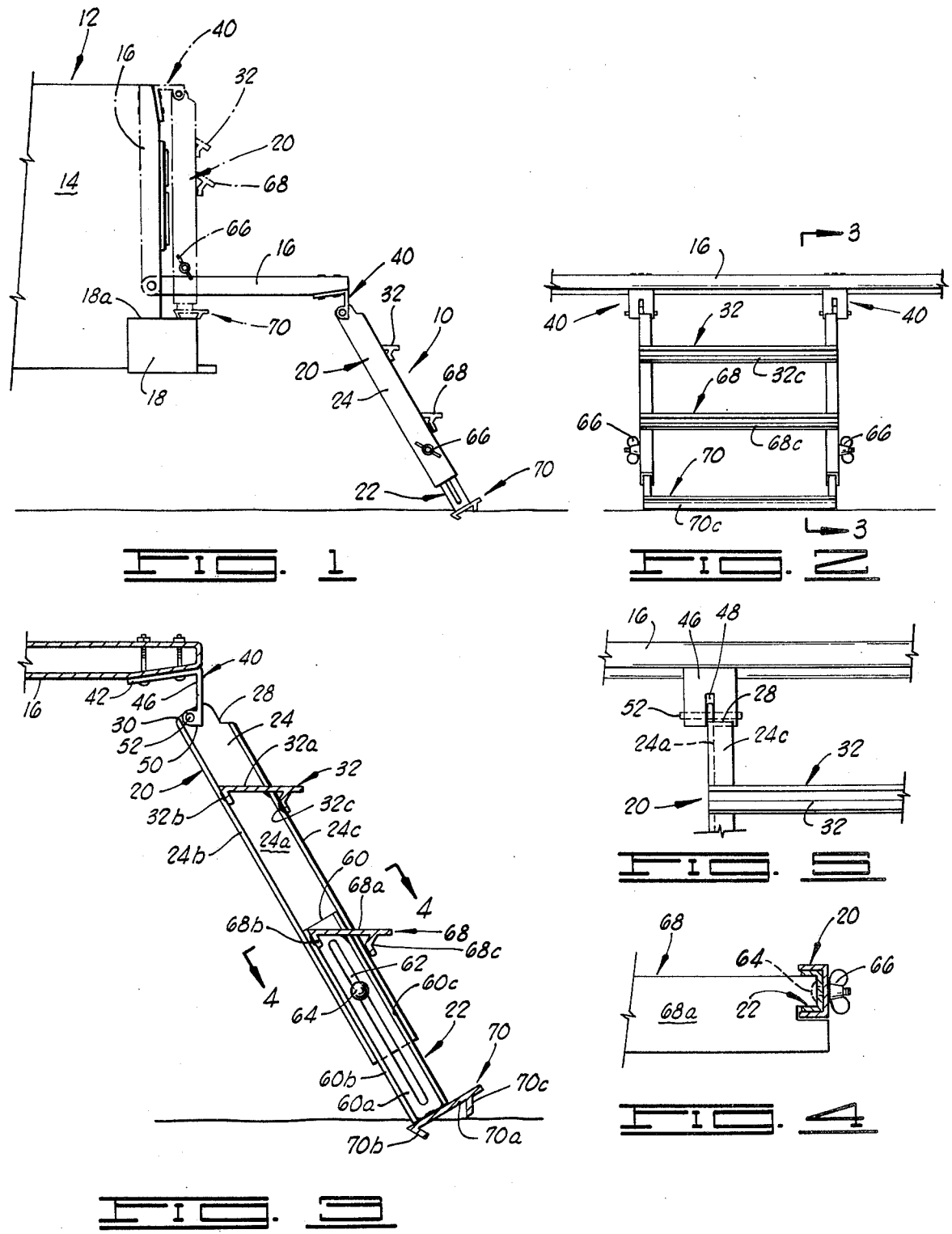

SELF-STORING STEP STRUCTURE FOR VEHICULAR MOUNTING

BACKGROUND OF THE INVENTION

1. Field of the Invention

This invention relates to step and ladder structures, and more particularly, to an extensible step structure adapted for mounting on a vehicle in a stored location in which the step structure is retained in its stored position by engagement with a bumper of the vehicle.

2. Brief Description of the Prior Art

Many types of step and ladder structures have been heretofore provided for the purpose of enabling various types of vehicles to be entered from outside the vehicle. Adjustability of the steps has been provided in some types of house trailer structures to permit one to ascend from ground level to the floor level of the house trailer, with adjustability in the length of the step being provided to accommodate variations in the surface of the terrain on which the vehicle may be parked. Step structures of various types have also been provided for the purpose of entering campers of the sort which are mounted in the bed of a pickup truck, and which have a door opening at the rear of the truck. Many of these structures have not been as stable as desirable in usage, and some have provided a storage problem when the vehicle is under way, and the ladder or step is out of use. In some instances, a simple, detached step ladder is provided to permit the camper to be entered when the vehicle is parked and the camper is in use.

A need has also existed to provide quick and easy access to the bed of a pickup truck for the purpose of unloading cargo from the truck. The simplest form of access structure which has heretofore been provided is a step bumper which includes a relatively broad upper surface which can be used as a step in stepping up from the ground to the bed of the pickup truck. More recently, some very simple ladder or step structures have been provided as an attachment to the tailgate of the truck so that when the tailgate is folded downwardly, a ladder is provided for ascending to the bed of the truck. Such structures do not, however, as currently made, have adequate stability, and frequently are left suspended in the air without the lower end of the step or ladder contacting the ground to provide a stable support for the structure.

BRIEF DESCRIPTION OF THE PRESENT INVENTION

The present invention provides an improved self-storing step structure for vehicular mounting, which structure broadly includes a first step section having a pair of horizontally spaced, lateral rail means with one or more steps extending between and interconnecting the rail means, an extensible step section which slidably engages the first step section to facilitate selective adjustment of the overall length of the step, the extensible step section also having a pair of lateral rail means interconnected by at least one step, means for pivotally connecting the first step section to a vehicle for pivotation about a horizontal axis between an operative position and a stored position, and means for adjustably interlocking the extensible step section and the first step section at a pre-selected location relative to each other.

In another and more specific aspect, the invention comprises the combination of a pivotally mounted tailgate of the type used on pickup trucks, with the described self-storing step structure which includes the first step section and the extensible step section referred to in the preceding paragraph, means for pivotally connecting the first step section to the tailgate, and a truck bumper located below the pivotal axis of the tailgate and positioned relative to the self-storing step structure for cooperation with an end of the extensible step section when the self-storing step is pivoted to a stored position.

An important object of the present invention is to provide a self-storing step structure for vehicular mounting, which step structure in its operative position, provides a stable ladder facilitating access to the interior of the vehicle or to the bed thereof, and which, in its stored position, is located in a non-obtrusive position which protects the step structure and avoids interference with the operation of the vehicle without reduction of the total storage space or internal capacity of the vehicle.

Another object of the invention is to provide a self-storing step structure for vehicular mounting which is adjustable in its overall length, and which, in use, is stable by reason of contact of the lower end thereof with the earth.

An additional object of the present invention is to provide a self-storing step structure for vehicular mounting, which step structure is sturdily constructed so that it may be used safely for entrance to and egress from, the interior of the vehicle, and which step structure can be moved into a compact storage position in which the structure occupies relatively little space.

An additional object of the invention is to provide a self-storing step structure which can be pivotally mounted on a vehicle to facilitate storage in either a downwardly extending or upwardly extending position in relation to a point of pivotal mounting of one end of the structure to the vehicle.

A further object of the invention is to provide a self-storing step structure for vehicular mounting, which step structure is provided with a very stable foot or base element at the lower end thereof so as to prevent a loss of stability of the step structure during its use as a result of sinking of the lower end of the step structure into very soft earth or sand.

Yet another object of the invention is to provide a self-storing step structure which can be secured to the vehicle for utilization without the necessity for cutting away portions of the vehicle or altering the vehicular structure in any substantial way so as to permanently deface or damage the vehicle.

Additional objects and advantages of the invention will become a-parent as the following detailed description of a preferred embodiment of the invention is read in conjunction with the accompanying drawings which illustrate the invention.

BRIEF DESCRIPTION OF THE DRAWINGS

FIG. 1 is a side elevation view illustrating the self-storing step of the present invention mounted upon the rear portion of a pickup truck, and illustrating, in solid lines, the down folded, operative position of the self-storing step, and illustrating in dashed lines, the upwardly folded, stored position of the self-storing step.

FIG. 2 is a rear elevation view of the self-storing step of the invention as it appears when mounted on a pickup truck, and showning the downwardly extending, operative position of the step.

FIG. 3 is a sectional view taken on line 3—3 of FIG. 2.

FIG. 4 is an enlarged detail view of the manner in which the rails used in the step section are slidably engaged and showing the means utilized for adjustably securing the step sections against movement relative to each other.

FIG. 5 is an enlarged detail view of the hinge structure employed for connecting one section of the self-storing step of the invention to a vehicle.

DETAILED DESCRIPTION OF A PREFERRED EMBODIMENT OF THE INVENTION

Referring initially to FIG. 1 of the drawings, a self-storing step structure of the present invention is designated generally by reference numeral 10, and is shown, for purposes of illustration, as it appears when mounted on a pickup truck designated generally by reference numeral 12. The pickup truck 12 includes a truck bed 14 having a tailgate 16 pivotally connected to the truck at the rear end of the bed 14, and adapted to pivot between a vertically extending closing position, as illustrated in dashed lines, and a horizontally extending position, illustrated in solid lines, in which latter position access to the interior of the truck bed 14 is afforded by the opening of the tailgate.

Secured to the chassis of the truck 12 at a location below the horizontal pivotal axis of the tailgate 16 is a horizontally extending bumper 18. The bumper 18 is of a type having a relatively broad upper surface 18a which forms a step by which one may step up into the bed 14 of the truck.

The self-storing step 10 includes a first step section designated generally by reference numeral 20, and an extensible step section designated generally by reference numeral 22. Referring initially to the first step section 20 in detail, this step section is comprised of a pair of horizontally spaced rails 24 which are each C-shaped channels having a web portion 24a from which project a pair of side flanges 24b and 24c. An end portion of each of the rails 24 is cut away or relieved as shown in FIG. 5 so that a relief 28 is provided at one corner of the rail, and a radiused surface 30 is provided at the other corner of the rail at this end thereof.

Extending between the side rails 24 and secured thereto by welding or other suitable means is at least one step member 32. In the illustrated embodiment, a single step 32 is illustrated, and includes a step platform 32a, a rear web 32b secured along one edge to the rear edge of the step platform 32a and projecting at an acute angle to the step platform 32a, and a forward web 32c. The forward web 32c is V-shaped in cross-section and is secured along one of its edges to the underside of the step platform 32a.

It will be perceived in referring to FIG. 3 that the step platform 32a is slotted to accommodate the flange 34c of each of the rails 24, and that the rear web 32b and forward web 32c are secured, as by welding, to the flanges 24b and 24c, respectively, of the rails 24. It may be noted in referring to FIGS. 1 and 3, that in the illustrated position of the tailgate 16 and the self-storing step structure 10, the rails 24 are inclined at an angle to the vertical in the projection of the self-storing step structure from its point of pivotal connection to the tailgate 16 to a location where the lower end of the step is in contact with the ground. It will further be noted that the step member 32 extends substantially horizontally when the rails are in this position. This relationship, which is necessary to assure that the steps will be horizontal when the assembly is in its operative position, is assured by the angles at which the webs 32b and 32c are extended to the step platform 32a.

For the purpose of pivotally connecting the upper end of the rails 24 to the tailgate 16, a pair of mounting brackets designated generally by reference numeral 40 are provided. The mounting brackets 40 are horizontally spaced along the upper edge of the tailgate 16. Each of the mounting brackets 40 includes a mounting plate portion 42 having a pair of bolt apertures therethrough to facilitate bolting of the mounting bracket to the tailgate. Further, each mounting bracket 40 includes a bifurcated neck portion 46 which carries a centrally disposed slot 48, and which has a hub portion 50 disposed at the free outer end thereof. The hub portion 50 is bored to receive a pivot pin 52 which is extended through a registering aperture formed in the upper end portion of each of the rails 24 at a location between the relief 28 and the radiused corner 30.

It will be noted in referring to FIG. 5 that the pin-receiving aperture in the upper end portion of each of the rails 24 is disposed relatively near to the radiused corner 30 in contrast to the forward side of each rail at which the relief 28 is located. Moreover, it will further be noted that the neck portion 46 of each mounting bracket 40 extends at an acute angle with respect to the mounting plate portion 42 thereof. The purposes of these structural geometric characteristics will be hereinafter explained in greater detail.

The extensible step section 22 is slidably telescoped in the lower end portion of the first step section 20. This telescoping relationship is achieved by the use of a pair of horizontally spaced rail members 60 which are each channels of C-shaped cross-section dimensioned to fit within the channels constituting the rails 24. Each of the rails 60 includes a web portion 60a having a pair of side flanges 60b and 60c projecting normal thereto. The flanges 60b and 60c slidably engage the flanges 24b and 24c of the rails 24 of the first step section 20.

In referring to FIG. 3 of the drawings, it will be noted that the web portion 60a of each of the rails 60 is characterized in having an elongated slot 62 formed therein and extending parallel to the flanges 60b 60c. Aligned with this slot in the web portion 60a of each of the rails 60 is an aperture formed through the web portion 24a of each of the rails 24. A carriage bolt 64 is extended through each of the slots 62 and through the registering aperture in the respective web portion 24a of one of the rails 24, and has threaded on the shank thereof at the outer side of the respective rail 24, a wing nut 66. Each of the carriage bolts 64 is positioned in its respective slot 62 so that the rectangular cross-sectioned throat of the bolt fits within the slot, and prevents rotation of the bolt about the axis of its shank.

Interconnecting the upper ends of the rails 60 is a step member 68. The step member 68 is formed somewhat similarly to the step member 32 and is provided with a step platform 68a which carries at its rear edge a rear web 68b and at its forward edge, a forward web 68c. In the case of the step member 68, however, a slot is formed in the side edges of the step platform 68a of sufficient width to accommodate the abutting flanges 60c and 24c of the rails 60 and 24, respectively, of both the first step section 20 and the extensible step section 22. It will also be noted in referring to FIG. 3 that the step member 68 is secured to the extensible step section 22 by welding the rear web 68b to the flange 60b, and by welding at the lower surface thereof, the step platform 68a to the flanges 60c of the rails 60. The forward web 68c is allowed to slide freely upon the flange 24c of the rails 24.

Secured across the lower ends of the rails 60 of the extensible step section 22, is a foot plate 70. The foot plate 70 includes a base portion 70a having a downwardly extending rear web or flange 70b and a downwardly extending front web or flange 70c. The rear and front flanges 70b and 70c project at acute angles with respect to the base portion 70a and are inclined toward each other as shown in FIG. 3 of the drawings.

USE AND OPERATION OF THE INVENTION

The self-storing step structure of the invention is versatile in its applications and several of these will be herein described to illustrate such versatility. In one of the primary usages of the step structure, the structure is employed in combination with the conventional tailgate and bumper structure on pickup trucks and the like. When the step structure of the invention is so employed, the mounting brackets 40 are initially bolted to the tailgate of the vehicle near the horizontal upper edge thereof and in horizontally spaced relation to each other. In some instances, it will be desirable to place rubber grommets or cushioning structures between the mounting plate portion 42 of the mounting brackets and the metal of the tailgate.

It will be noted in referring to the drawings that a typical tailgate structure 16 is illustrated, and that as such tailgates are now fabricated, there is a bevel or inclination near the upper edge of the tailgate where the thickness of the tailgate is reduced. As the mounting brackets 40 are secured to the tailgate at this location, the bevel referred to as characteristic of such tailgates results in the bifurcated neck portion 46 of each of the mounting brackets 40 extending substantially horizontally outwardly from the rear portion of the truck when the tailgate is in the up or closed position. It may be noted at this point that in mounting the step structure on the tailgate, it is only necessary to drill a pair of holes through the tailgate for use in securing the mounting brackets thereto with suitable bolts, and that other structural alteration of the tailgate is not necessary.

When the mounting brackets 40 have been secured to the tailgate 16 in the manner described, the first step section 20 carrying at one end thereof the extensible step section 22 is pivotally connected to the hub portions 50 of the mounting brackets 40 by inserting the web portions 24a of each of the spaced rails 24 in the slots 48 which are centrally disposed in the brackets 40. The apertures formed through the web portions 24a are then aligned with the bores formed through the hub portions 50 of the brackets and the pivot pins 52 are inserted through the aligned bores and apertures to effect the desired pivotal connections.

As has been previously pointed out, the pivotal connection of the rails 24 to the brackets 40 is made in a way such that the reliefs 28 formed at the upper end of each of the rails 24 faces rearwardly with respect to the truck 12, and the radiused corner 30 faces toward the truck. As a result of this mode of connection, and the size of the centrally disposed slots 48, along with the provision of the reliefs 28 and radiused corners 30, the first step section 20 and associated extensible step section 22 can be pivoted about the pivot pins 52 through an angle of at least 180°. This freedom of pivotation facilitates the extension of the first step section 20 and extensible step section 22 substantially parallel to the tailgate 16 when the tailgate is closed. Such an arrangement is illustrated in FIG. 1 of the drawings in dashed lines, and enables a function hereinafter described to be realized. At the other extreme of the pivotation capability of the first step section 20 and associated extensible step section 22, these structures can be pivoted so as to extend upwardly from the tailgate 16 as it is shown in FIG. 1. Such upwardly extended position in reference to the level at which the mounting brackets 40 are secured upon a vehicle enables the self-storing step structure 10 of the invention to be mounted on the rear wall of campers, or on tailgates used in conjunction with truck mounted campers, in a way which will allow the self-storing step structure to be pivoted upwardly into juxtaposition to such rear wall, and there secured for storage purposes as an alternative storage position to that which is more frequently employed as hereinafter described.

When the spaced rails 24 have been pivotally connected to the brackets 40 in the manner described and after such brackets have been properly secured to the tailgate 16, the self-storing step structure of the invention is ready for use. In operation, the structure of the invention may be considered as having two statuses — these being a stored status and an in-use or operative status. These two statuses of the self-storing step structure are illustrated by the dashed line and full line positions, respectively, shown in FIG. 1.

Referring initially to the full line depiction of the self-storing step structure as it is shown in FIG. 1, it will be perceived that here the tailgate 16 of the vehicle 12 has been folded down to a horizontally extending position, at which position the tailgate encounters a stop or other supporting structure to prevent further downward movement. The self-storing step structure is placed in the illustrated operative position by first loosening the wing nuts 66 so that the rail members 60 of the extensible step section 22 may be slid downwardly relative to the rail members 24 of the first step section 20, thereby increasing the overall length of the two telescoping sections. In use, the extensible section 22 can be extended downwardly to any suitable degree within the capability of the elongated slot 62 to accommodate such extension. The degree of extension which is effected in any instance will depend upon the inclination of the step structure which is desired — that is, the steepness which one may wish to characterize the step structure —, and upon the distance from the ground to the horizontally extending tailgate 66, which distance may vary to some slight degree due to variations in the evenness of the terrain upon which the truck 12 is parked from time to time.

It will be noted from the description thus far of the operation of the self-storing step structure that the extensible step section 22 is freely movable relative to the step section 20 within the limits of movement facilitated by the slot 62. It will further be noted that when the extensible section 22 is extended downwardly to the in-use or operative position of the self-storing step structure, the step member 68 moves downwardly away from the step member 32 until the vertical spacing between these step members is that which is normally characteristic of consecutive steps in step and ladder structures.

When the step structure 10 is in the operative position illustrated in full lines in FIG. 1, the foot plate 70 provides a firm and stable foundation or support for the step structure and prevents the extensible section 22 from sinking or being forced downwardly in soft earth or sand. Also, the inclusion of the front and rear web portions 70b and 70c on the foot plate prevents skidding or sliding of the extensible step section, and assists in the anchoring function of the foot plate.

The self-storing step structure, when thus placed in use, presents an easily and safely used access route to the bed of the pickup truck 12, or to a truck mounted camper which may be carried in the bed of the truck. The step structure is particularly useful when employed for providing access to such campers since, without benefit of the step structure, one must simply jump or hop from the tailgate 16 to the ground after the tailgate has been opened out away from the rear wall of the camper, thus risking injury, as well as experiencing substantial inconvenience both in entering and leaving the camper.

The step structure 10 is very strong, and can support heavy persons or persons carrying a heavy load into the bed of the pickup truck. The step members 32 and 68, by their construction particularly enhance the strength of the self-storing step structure, both by reason of the way they are secured to the rails 24 and 60, and by reason of the inclusion as a part of each step member of the rear web 32b and the forward web 32c on each. It will be further noted that due to the manner in which the step member 68 is secured between the rail members 60 of the extensible section 22 with the forward web 68c slidably engaging the flanges 24c of the rails 24, and also by reason of the closely fitting engagement of the channels making up the rail members 60 with the channels constituting the rail members 24, that even if the wing nuts 66 are not used to firmly lock the extensible section 22 in its downwardly extended operative position, little danger exists in using the step structure 10 because a weight imposed upon either of the step members 68 or 32 will cause binding to occur between the extensible section 22 and the first section 20.

When utilization of the self-storing step structure 10 for affording access to the bed of the truck 12 has been completed, the tailgate 16 is folded up to its upstanding, closure position, and simultaneously, the step structure is telescopingly collapsed to its storage position. This is most easily accomplished by loosening the wing nuts 66 (if they have been tightened), and then simply pushing upwardly on the under side of the step member 68. This will cause the extensible step section 22 to slide upwardly in the first step section 20 until the carriage bolts 64 reach the lower end of the slots 62, at which point movement of the extensible section into the first section will be arrested. At this time, the step member 68 will be positioned relatively closely to the step member 32 and the length of the self-storing step structure will be foreshortened substantially.

As the tailgate 16 continues in its pivoting movement to an upwardly extending position, the step structure 10 pivots about the pivot pins 52 until the first step section 20 and associated extensible step section 22 extend substantially parallel to the tailgate 16 when the tailgate is in its closing position. It will be noted that at this time, the foot plate 70 is directly over the bumper 18 of the truck and, more specifically, is aligned with the upper surface 18a thereof. When such alignment is achieved, the extensible section 22 is slid downwardly in the first step section 20 until the front web 70c of the foot plate 70 comes to rest on the upper surface 18a of the bumper 18. By this contact, there is afforded substantial frictional engagement between the lower end of the self-storing step structure 10 and the bumper 18 so that the step structure is retained in this position during over-the-road travel of the vehicle. It will be perceived that in the stored position, as illustrated in dashed lines in FIG. 1, the step structure is unobtrusive, and does not interfere with any of the functions or operations of the vehicle. Moreover, it does not project or protrude beyond the bumper 18 so as to afford any interference with the function of the bumper.

It should be pointed out that with some types of relatively long campers adapted for mounting in the bed of a pickup truck, the tailgate 16 can be removed from the truck and easily secured, by the use of suitable angle iron members, to the front wall of the camper at a location where the tailgate can be used to afford a porch or platform when lowered. When the tailgate is thus mounted on the camper, the functions ascribed to the self-storing step structure, and the ability to store the structure in the manner described, except for frictional engagement with the bumper, are still attained. Storage in the described position can be facilitated by the use of any suitable securing device for securing the lower end of the extensible step structure to a suitable point on the camper wall in these instances. It is also possible, and may in some cases be desirable, to store the self-storing step structure in a position where the first step section 20 and the extensible step section 22 extend upwardly from the point of mounting to the camper by the use of the mounting brackets 40. In these instances, it is possible, as has been previously pointed out herein, to pivot the step structure upwardly without hindrance or prevention as a result of the manner in which the ends of the rails 24 connected to the brackets 40 are geometrically configured.

Although the foregoing description and accompanying drawings have afforded an understanding of the specific structures used in a preferred embodiment of the invention, as well as of the basic principles which underlie the invention, it is to be understood that various changes in the illustrated and described structure, which allude to such preferred embodiment, can be made without departure from these basic principles. Changes and innovations of this type are therefore deemed to be circumscribed by the spirit and scope of the invention except as the same may be necessarily limited by the appended claims, or reasonable equivalents thereof.

What is claimed is:

1. In a truck of the type having a tailgate including a forward side and a rear side, and pivotally supported on the truck for pivotation about a horizontal axis between a vertically extending position and a horizontally extending position, said tailgate further including a lower edge positioned proximate the pivotal axis of the tailgate, and an upper edge spaced above the lower edge, said truck further including a horizontally extending bumper positioned below the tailgate and rearwardly of the plane occupied by the tailgate when the tailgate occupies said vertically extending position, the improvement which comprises:

a plurality of mounting brackets connected to said tailgate adjacent the upper edge thereof, and on the rear side thereof;

a self-storing step structure pivotally connected to said tailgate for pivotation through 180° about a horizontal axis, said step structure comprising:
- a first step section pivotally connected to said mounting brackets for pivotation about a horizontal axis through 180°, including pivotation to a position over the bumper and vertically aligned therewith at a time when the tailgate is in its vertically extending position, said first step section comprising:
  - a pair of spaced rails of C-shaped cross-section; and
  - at least one step member extending between and engaged with said spaced rails; and
- an extensible step section disposed in substantially coplanar alignment with said first step section and comprising:
  - a second pair of spaced rails of C-shaped cross-section including ends slidably registering with, and nesting in, the spaced rails of said first step section; and
  - a step member extending between, and engaged with, said second rails of said extensible step section, said step member in said extensible step section including:
    - a step platform; and
    - a web secured to said step platform along one edge thereof and resting slidably upon the spaced rails of said first step section;
- means for adjustably interlocking said first step section with said extensible step section at a selected position therealong whereby the overall length of said self-storing step structure can be selectively varied, and said step sections can be retained against relative sliding movement to undesirably change said selected length of the self-storing step structure; and
- a foot plate secured across the ends of said second rails of said extensible step section remote from the ends thereof slidably registering with the rails of said first step section for supporting said step structure on the earth when said tailgate is pivoted to its horizontally extending position, and said step structure is pivoted downwardly from the horizontally extending tailgate to the ground, and for frictionally engaging the lower end of the self-storing step structure with the upper side of the bumper for storage and transport when the tailgate is in its vertically extending position.

2. The improvement defined in claim 1 wherein the transverse thickness of said step structure, as measured normal to the plane of the tailgate when the tailgate is in its vertically extending position, is less than the transverse thickness of the bumper, as measured in the same direction whereby the bumper projects rearwardly further from the truck than doew the self-storing step structure when the step structure is in its stored position.

3. The combination defined in claim 1 wherein each of said mounting brackets comprises:
- a mounting plate portion; and
- a bifurcated neck portion projecting from said mounting plate portion and away from said tailgate, said bifurcated neck portion having a bored hub portion spaced from said mounting plate portion; and
- a pivot pin extended through the bored hub portion of each of said bifurcated neck portions, and pivotally connecting said first step section to said bifurcated neck portion at a location spaced from said tailgate, and facilitating pivotation of said step structure through about 180° about a horizontal axis coinciding with the axis of said pivot pins.

4. The combination defined in claim 1 wherein said means for adjustably interlocking said first step section with said extensible step section comprises:
- a plurality of bolts extending through a portion of each of said step sections and movable relative to said extensible step section; and
- wing nuts on said bolts and tightenable to interlock said step sections against movement relative to each other.

* * * * *